United States Patent
Yun et al.

(10) Patent No.: US 7,365,918 B1
(45) Date of Patent: Apr. 29, 2008

(54) FAST X-RAY LENSES AND FABRICATION METHOD THEREFOR

(75) Inventors: Wenbing Yun, Walnut Creek, CA (US); Michael Feser, Walnut Creek, CA (US); Alan Lyon, Berkeley, CA (US)

(73) Assignee: Xradia, Inc., Concord, CA (US)

( * ) Notice: Subject to any disclaimer, the term of this patent is extended or adjusted under 35 U.S.C. 154(b) by 92 days.

(21) Appl. No.: 11/200,654

(22) Filed: Aug. 10, 2005

Related U.S. Application Data

(60) Provisional application No. 60/600,159, filed on Aug. 10, 2004.

(51) Int. Cl.
*B02B 3/08* (2006.01)

(52) U.S. Cl. .................. 359/742; 359/741; 359/743

(58) Field of Classification Search ............... 359/742, 359/741, 743, 566, 568, 569, 571
See application file for complete search history.

(56) References Cited

U.S. PATENT DOCUMENTS

| | | | |
|---|---|---|---|
| 5,382,342 A * | 1/1995 | Bionta et al. | 204/192.26 |
| 5,623,473 A | 4/1997 | Ichihara | |
| 5,711,890 A * | 1/1998 | Hawkins et al. | 216/24 |
| 2003/0086056 A1* | 5/2003 | Gupta et al. | 351/177 |

| | | | |
|---|---|---|---|
| 2005/0032378 A1 | 2/2005 | Yu et al. | |

FOREIGN PATENT DOCUMENTS

| | | | |
|---|---|---|---|
| EP | 0 555 554 A1 | | 7/1982 |
| JP | 2-93403 | * | 4/1990 |

OTHER PUBLICATIONS

Rudolph, D., et al. "Status of the sputtered sliced zone plates for x-ray microscopy." Proceedings of SPIE, vol. 316, pp. 103-105, 1981.
Spector, W, et al., "Process optimization for production of sub-20 nm soft x-ray zone plates." Journal of Vacuum Science and Technology, B 15(6):2872-2876, 1997.
Underwood, J., et al. "X-ray microscope with multilayer mirrors." Applied Optics, vol. 25, No. 11, pp. 1730-1732, 1986.

* cited by examiner

*Primary Examiner*—Timothy Thompson
(74) *Attorney, Agent, or Firm*—Houston Eliseeva LLP

(57) ABSTRACT

A fabrication process for zone plate lenses is based on controlled thin layer deposition for fabricating structures as small as 2 nanometers (nm) in width, and potentially smaller. The substrate for deposition will take the form of a precision hole, fabricated in a substrate, such as silicon by electron beam lithography and subsequent reactive ion etching. A controlled layer deposition is then used to form the required zone plate structure. A subsequent thinning process is used to section the hole and produce a zone plate with the required layer thicknesses.

27 Claims, 2 Drawing Sheets

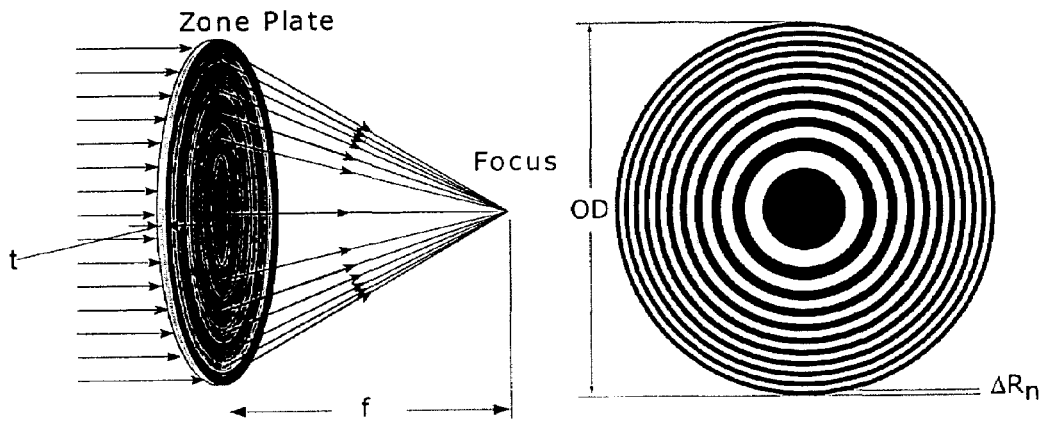
Fig. 1A
Fig. 1B
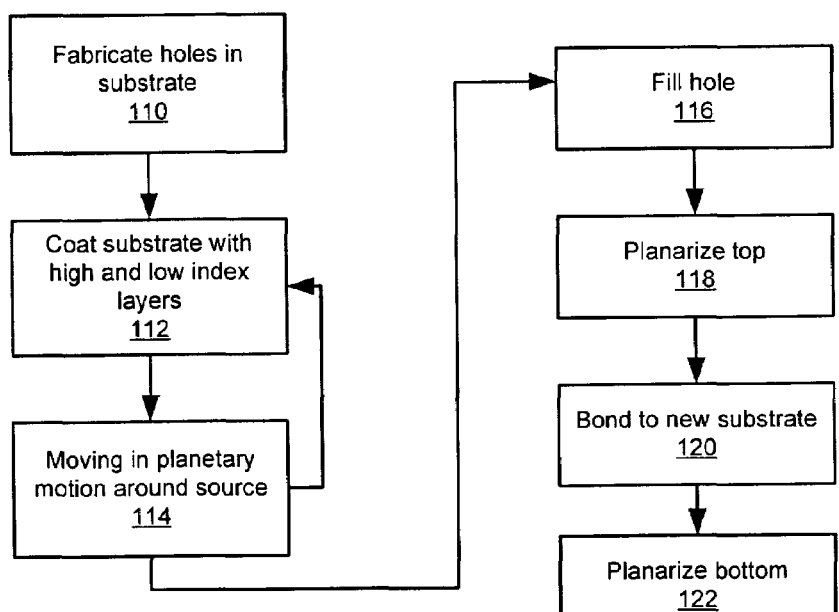
Fig. 2
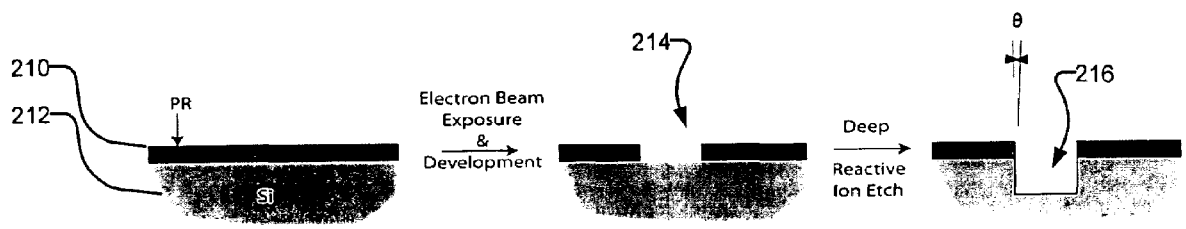
Fig. 3

FAST X-RAY LENSES AND FABRICATION METHOD THEREFOR

RELATED APPLICATIONS

This application claims the benefit of U.S. Provisional Application No. 60/600,159 filed on Aug. 10, 2004 which is incorporated herein by reference in its entirety.

BACKGROUND OF THE INVENTION

X-ray imaging technology plays a critical and important role in healthcare and biomedical research. X-ray radiography is one of the most important and widely deployed medical diagnostic methods that can be traced back to the invention of x-rays more than 100 years ago. Recently, soft x-ray cryo-microscopy has been demonstrated to offer non-destructive high resolution three dimensional tomographic imaging of single biological cells with a resolution of about 25 nanometers (nm) in two dimensions (2-D) and 60 nm in three dimensions (3-D). Important trace elements in a biological specimen such as a cell or tissue can be mapped with sensitivity better than parts per billion at a spatial resolution of about 100 nm using a synchrotron based x-ray fluorescence microscope.

An additional important application for higher performance zone plate lenses is high throughput laboratory protein crystallography systems. The knowledge of three-dimensional structures of proteins gives insight into their functionality, and can provide key information for rational drug design to treat human diseases. The underlying hypothesis is that if the structure of the active site of a critical enzyme in a metabolic or regulatory pathway is known, the chemical compounds can then be designed to inhibit or affect the behavior of that specific enzyme. Information on the structural design of proteins also facilitates protein engineering to purposely modify the structures of proteins for specific applications. Thus far, structures for about 19,000 proteins have been deposited in the protein data bank, including 3300 entries added in 2001, out of about 100,000 proteins assumed to be manufactured in the human body, and of course protein structures from other organisms are of great scientific, societal, and commercial interest as well.

At present, it is very difficult to predict the proper folded structure for proteins based on their amino acid sequences. X-ray protein crystallography is the single most useful tool to determine macromolecule structures such as proteins, especially for molecular weights above about 30 kD. Currently, a typical laboratory based x-ray protein crystallography facility is expensive to equip, and it takes a day or two to collect diffraction data sufficient to determine a new protein structure once proper crystallization conditions have been found. Considering the possibility that many attempts are often made to obtain data sufficient for structural determination (due to sample quality, etc.), solving structures of all 10,000 proteins will be a great challenge in both facility cost and human effort. The alternative approach is to use synchrotron beamlines for data collection, where the higher flux and brightness of the source, along with its energy tunability for methods like multiple wavelength anomalous dispersion (MAD), means that an entire dataset appropriate for rapid structure determination can be collected in a matter of hours.

More generally, x-ray microscopy is a complementary tool to light and electron microscopes for biomedical and other research. In recent years, increasingly powerful imaging methods have provided more detailed views of cells. Making use of the development of function specific labeling and contrast enhancement techniques, many forms of imaging techniques have been employed to enable researchers to make key discoveries of the working mechanisms of cells and biological systems. The ability to perform function specific imaging using labels, such as green fluorescent protein, quantum dots, and immunogold, provides the means to elucidate the important link between the working mechanism of cells and tissues and molecular machines at the protein, DNA, and macromolecular assembly level. Optical and electron microscopes are essential for many of these important discoveries and have been widely deployed in biomedical research laboratories. However, various limitations exist in the current microscopy techniques. Existing systems can not address the needs of biologists who wish to visualize the organization of organelles inside a single cell, or connections (such as synapses) between two or more cells with high resolution.

Critical to the development and performance of x-ray microscopes are x-ray lenses that image the x-rays from the object of interest onto a detector system such as an optical stage or directly on an electronic detector device. The task of focusing x-rays has occupied physicists for over a century. All three well known optical phenomena (refraction, reflection, and diffraction) have been exploited to produce x-ray lenses with unique advantages and limitations.

The main challenge (but also a unique advantage) when dealing with x-rays is that they interact with matter only very weakly. The difference in the refractive index between vacuum (or air) and solids is less than $10^{-5}$ for 8 keV x-rays even for dense materials like gold. To overcome this, a concept of using many weakly focusing lenses arranged along the optical axis (termed "compound refractive lens") was proposed about 10 years ago to increase the effective numerical aperture of refractive x-ray lenses. Although significant progress has been made over the years, its performance in terms of numerical aperture and resolution significantly lags behind the currently available reflection and diffraction based x-ray lenses. The numerical aperture achievable using this type of x-ray lenses is fundamentally limited due to photoelectric absorption for low energy x-rays and Compton scattering for high energy x-rays.

Reflection based lenses are capable of obtaining fairly large numerical apertures especially when the reflecting surface is coated with a multilayer with a small period, but their resolution is limited by stringent tolerance requirements in the smoothness and the slope error of the reflecting surface. Furthermore, the field of view of a reflection based lens is typically very small unless a special, axially symmetric optical design such as a Wolter mirror is used, which employs two consecutive reflections off internal surfaces of parabolic and hyperbolic shape. Since it is difficult to achieve 100 nm resolution using a single monolithic reflecting surface under the optimal conditions, no one has been able to produce a reflection based lens with a reasonable field of view and sub-micrometer resolution.

X-ray zone plates are diffraction based lenses and currently offer the best optical performance for high resolution x-ray imaging and home-lab protein crystallography utilizing a microfocus x-ray source. They combine the highest spatial resolution (~20 nm with soft x-rays) achievable over the whole electromagnetic spectrum and a large field of view that can be up to ⅓ of the zone plate diameter (typically many tens of micrometers).

Currently the best performing zone plate lenses for x-rays in terms of resolution and efficiency are fabricated by means of a deep pattern transfer process based on semiconductor/ microelectromechanical system (MEMS) technology. In this process a zone plate pattern is written by electron beam lithography in a very thin layer of high-resolution photoresist. This pattern is transferred by a directional (anisotropic) reactive ion etch into a thick layer of photoresist, which forms the mold for electrochemical plating of a metal. For soft x-rays (<1 keV) zone plates with outermost zone widths as small as 20 nm have been demonstrated. For hard x-rays the zone thickness requirement increases drastically (from 100 nm for soft x-rays to 1600 nm for 10 keV x-rays) making the fabrication of fine outermost zones much more challenging. Current state of the art zone plate fabrication technology is based on a multi-level lithographic process based on microfabrication technology for manufacturing semiconductor devices. The process however is limited in the smallest achievable zone width and especially in obtaining adequate thickness for efficient focusing of multi-keV x-rays.

SUMMARY OF THE INVENTION

While the progress in the fabrication of hard x-ray zone plates has significantly advanced within the last few years, the existing pattern transfer fabrication processes may reach a practical limit very soon. As the polymer structures of the electroplating mold become smaller and smaller in width they loose strength and tend to collapse during the fabrication process. Also the directionality of the reactive ion etch may impose practical limits to the achievable sidewall angle in the resist, limiting the achievable width of features that can be fabricated. From current fabrication data it can be estimated that the practical limit for hard x-ray zone plates using current pattern transfer technology is around 20-30 nm (structure height ≅1 µm).

It has been proposed and demonstrated to use a wire as the substrate and deposit alternating layers of high- and low-Z materials in a controlled way to obtain the correct pitch for a zone plate. In this process the wire is subsequently sliced and polished to obtain a zone plate. It has been found, however, that for these "Sputter-Sliced zone plates" imperfections in the wire and defects during deposition lead to accumulative errors in the fine outermost zones, which are deposited last. Furthermore, it proved very difficult to slice the wire without deforming the delicate zone plate structure. The resulting zone plates therefore fell short of expectations leading to the abandonment of this project.

The present approach to fabricating zone plate lenses is based on controlled thin layer deposition for fabricating structures as small as 2 nanometers (nm) in width, and potentially smaller. The substrate for deposition will take the form of a precision hole, fabricated in a substrate, such as silicon by electron beam lithography and subsequent reactive ion etching. A controlled layer deposition is then used to form the required zone plate structure. A subsequent thinning process is used to produce a zone plate with the required thickness.

The approach can be used to develop a fast x-ray lens that will improve the performance of all the x-ray techniques described above, which are limited by the currently available x-ray lenses. One example is a diffractive zone plate lens with an outermost zone width of about 7 nm and with a thickness optimized for a desired x-ray energy working over a large range of energies. It can thus have a numerical aperture (NA) that is 5-10 times bigger than the NA of x-ray focusing optics currently available. Its figures of merit, such as resolution and throughput, are proportional to NA or $NA^2$ respectively. It will enable the development of 3-D x-ray microscopy and x-ray elemental mapping with sub-10 nm resolution using synchrotron x-ray sources, and a compact laboratory source-based protein crystallography system with a throughput more than 10 times better than the best commercially available laboratory system at a significantly lower cost.

An x-ray microscope utilizing the disclosed lenses technology can have better than 20 nm spatial resolution for 2-D imaging and 60 nm for 3-D imaging. These values are significantly inferior to those of available electron microscopes but the proposed x-ray microscope is well compensated by its other unique capabilities, such as imaging single cells and relatively large tissue samples in their entirety without cross sectioning and in their natural state without staining, and substantially higher sensitivity for elemental analysis. Furthermore, its resolution may be sufficient for many important applications and it will offer significantly higher throughput in 3-D imaging of single cells and tissues compared to electron microscopy.

In general according to one aspect, the invention features a method for fabricating a zone plate. The method comprises forming a hole in a substrate, depositing successive layers into the hole, and sectioning the successive layers in the hole to form a zone plate lens.

In embodiments, the step of forming the hole comprises forming the hole with vertical sidewalls. However, sloping sidewalls of between 0.5 and 10 degrees can also be fabricated.

Preferably during the layer deposition, the substrate is rotated, such as in a planetary fashion if the deposition process is directional such as in physical vapor deposition. No rotation is necessary if a non-directional deposition process such as chemical vapor deposition or atomic layer deposition is employed.

The sectioning is preferably accomplished by polishing, such as chemical mechanical polishing (CMP), the substrate.

During or after polishing, wafer bonding can be used to ensure that integrity of the zone plate.

In general according to another aspect, the invention features a zone plate lens made by a method comprising forming a hole in a substrate, depositing successive layers into the hole, and sectioning the successive layers in the hole to form the zone plate lens.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1A and 1B are schematic representations of a zone plate lens illustrating its key parameters;

FIG. 2 is a flow diagram illustrating the process for fabricating the zone plate according to the present invention;

FIG. 3 illustrates the fabrication process for a precision substrate hole;

DETAILED DESCRIPTION OF THE PREFERRED EMBODIMENTS

Figure 4:
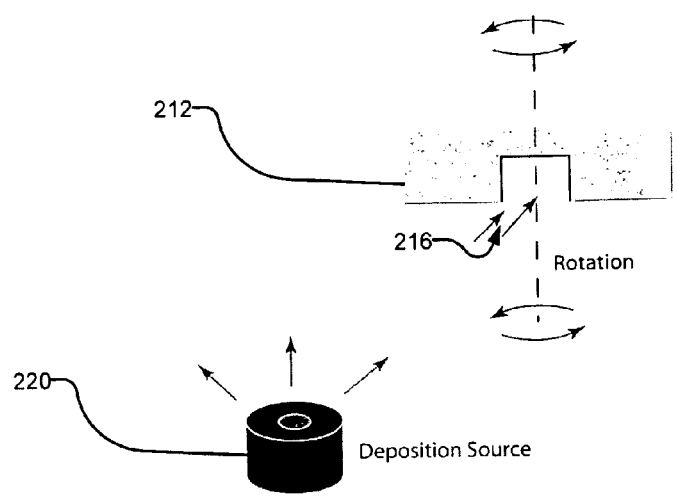
FIG. 4 illustrates the inventive deposition process.

The two most important parameters for a home-lab based protein crystallography system are the throughput and the quality of diffraction spots. Because a zone plate lens has the best focusing property among x-ray focusing elements as demonstrated by its achievement of sub-100 nm resolution and a large field of view, it provides high quality diffraction data sets with clean diffraction spots. The figure of merit of a zone plate lens in terms of throughput for a zone plate based home-lab protein crystallography system is discussed below.

In general, the flux F (in photons per second) incident on a protein crystal in a home-lab protein crystallography system using a focusing optic such as a zone plate or a reflection based focusing mirror is given by $$F = \eta B_c L^2 \Delta\theta^2, \quad (1)$$

where $B_c$, L, and $\Delta\theta$ is the beam brightness, the linear dimension, and the divergence of the illumination beam at the position of the protein crystal, respectively; and $\eta$ the focusing efficiency of the focusing optic. The beam size L is typically selected either to match the size of the protein crystal or to somewhere in the range of a fraction of a millimeter. The divergence of the beam $\Delta\theta$ is typically in the range of 1-3 mrad (0.06-0.2 degrees).

Expression (1) shows that for a given illumination beam size L and divergence $\Delta\theta$, F is proportional to the beam brightness $B_c$. It is important to point out that the beam brightness $B_c$ at the crystal position is typically smaller than the original source brightness B because the inherent aberration of the focusing optic leads to an increase in the effective source size, i.e., the image of the source is blurred. This effect is similar to the blurring of the image of the sun when looking at the reflection off a surface which is not perfectly flat (e.g. a lake with surface ripples). $B_c$ and B are approximately related by $$B_c = \frac{S^2}{S^2 + \delta^2} B, \quad (2)$$

where S is the diameter of the x-ray source (assuming circular shape) and $\delta$ the diameter of the focus spot size of the focusing optic for a point source (point spread function). Expression (2) illustrates that there can be significant degradation of the source brightness B, i.e., $B_c$ is smaller than B, if $\delta$ is comparable to or larger than S. It is therefore important to have $\delta$ much smaller than S to avoid the reduction of the source brightness B by imperfections of the focusing optic. We expect no degradation of the source brightness when a zone plate lens is used as the focusing optic, since they can be fabricated with outstanding precision. On other hand, we expect that there may be substantial degradation with reflection based mirrors that use two successive surface reflections.

Because expressions (1) and (2) show that F is proportional to B, it is important to make the x-ray source as bright as possible. The brightness of an electron bombardment source is proportional to the flux density of energetic electrons impinging on the x-ray target anode. The brightness is limited by the maximum electron density that can be used before melting the target. Two methods have been used to increase the electron density: using a rotating anode to spread the heat over a large area, and using a micro-sized electron spot (microfocus source) to reduce the thermal path to produce a large thermal gradient for better thermal dissipation. The maximum thermal loading of a widely deployed rotating anode (Rigaku UltraX 18) is quoted as 1.2 kilowatt (kW) over an electron spot size of 100 micrometers (www.globalspec.com) and that of a microfocus x-ray source from Hamamatsu is quoted 5W and 10W over an electron spot size of 4 and 7 micrometers, respectively (www.hamamatsu.com). Based on these specifications, one sees that the microfocus x-ray source is about 2.6 and 1.7 times brighter than the rotating anode for the 4 and 7 micrometers x-ray spot sizes, respectively.

An erroneous misconception on the microfocus x-ray source for the protein crystallography application is that it does not have enough x-ray power, i.e., small F. This misconception may originate from the fact that the focusing optic in most of the current home-lab protein crystallography systems is setup to image the source at a magnification close to 1:1 and thus a small source spot would indeed mean a small beam on the protein crystal and thus F would be small according to Expression (1). However, an illumination beam at the crystal with a sufficiently large size and a suitable beam divergence can be produced from a microfocus x-ray source if the focusing optic is configured to magnify the source image on the crystal without blurring it. To utilize the available x-ray flux (brightness) of the microfocus source, the focusing optic has to have a sufficiently large numerical aperture (NA) so that a desired value of $\Delta\theta$ is maintained even in the magnifying geometry. The numerical aperture required for a given source magnification M to keep a desired $\Delta\theta$ is given by $$NA = 0.5 M \Delta\theta. \quad (3)$$

For example, for M=25 and $\Delta\theta$=1 mrad (0.057 degree), a focusing optic with a NA of 12.5 mrad is required. For 8 keV x-rays, the corresponding zone plate would have an outermost zone width of about 6 nm. Such a zone plate can not be fabricated using the currently available fabrication technology. It is the goal of the proposed project to overcome the fabrication challenges of zone plates with high NA and utilize them for high throughput home-lab based crystallography systems.

Spatial resolution, modulation transfer function, and throughput are among the most important parameters characterizing the performance of any microscope. The numerical apertures (NAs) of the condenser and objective optics in a microscope are critical in determining these parameters. For x-rays, the NA is given by the half-angle subtended by a lens in respect to the sample.

The magnitude of the NA of an objective directly determines the spatial resolution $\delta$, which is given by $$\delta = 0.61 \frac{\lambda}{NA}, \quad (4)$$

where $\lambda$ is the wavelength of the x-rays. For a zone plate lens, the NA is directly connected to the outermost zone width $\Delta R$:

$$NA = \frac{\lambda}{2\Delta R} \quad (5)$$

The resolution δ therefore is approximately equal to its outermost zone width ΔR, which is determined solely by the smallest zone width that can be fabricated by available technology.

The modulation transfer function (MTF), another very important characteristic of any imaging system, quantitatively describes the degradation of fine feature visibility (attenuation of high spatial frequencies) in the image compared to the features present in the object. Generally the MTF decays in an approximately linear fashion from a value of 1 at zero spatial frequency (full visibility of coarse features) to zero (no visibility) at the frequency cutoff of the imaging system. This cutoff is proportional to the NA, and therefore one needs to maximize the NA for best imaging quality and spatial resolution.

The throughput of a microscope, which corresponds to the time it takes to acquire an image with adequate statistics, depends on the light collection capability of the imaging system and on the focusing efficiency η of the lens. To collect more x-rays and shorten the exposure time, the NA of the condenser and objective lens of a microscope needs to be as large as possible, since the throughput is directly proportional to the accepted solid angle, which is given by approximately $\pi(NA)^2$. For this reason it is desirable to use a NA as large as possible, even if the desired spatial resolution would require only a smaller NA. The most important parameter governing the efficiency η of a zone plate lens is the zone height (or thickness). For optimum efficiency at multi-keV x-ray energies, the desired zone height becomes quite large. In the case of 8 keV x-rays and gold as a zone construction material, a gold thickness of about 1.5 μm would be required to achieve the optimum efficiency.

Specialized imaging modes such as phase contrast and dark field imaging are very important for x-ray microscopy. These imaging modes require high NA optics, for which a closer match between the wavelength of the light and the resolution can be achieved.

In conclusion, the spatial resolution, MTF and throughput critically depend on the availability of high NA lenses, which require zone plates with very fine zones. At the same time the zone thickness has to be kept high to achieve a large focusing efficiency.

The present fabrication method uses thin-film deposition technology which has been used for "sputtered-sliced zone plates" in the past. The thin film technology is a very well established technique to make multilayer mirrors for extreme ultra-violet radiation (EUV). It has been used to produce highly reflective multilayers by alternating deposition of a high-Z and low-Z material in a controlled manner. Layer stacks with many hundreds of periods and period dimensions as small as 6 nm can be produced without significant layer interdiffusion, layer misregistration and residual stress.

FIGS. 1A and 1B are schematic representations of a zone plate lens. Its key parameters are:

the outermost zone width $\Delta R_n$ which determines the numerical aperture (NA=λ/(2ΔR)) and also the maximum achievable resolution δ(δ=1.22ΔR);

the material and the height (thickness) t of the zones, which determine the achievable focusing efficiency η, and the diameter OD which determines the maximum usable field of view (field of view ≅⅓ OD).

For x-ray imaging and home-lab based crystallography zone plates are desired with very high resolution and NA and hence very small outermost zone width. The present system can fabricate zone plates with outermost zone width ΔR as small as 5 nm while keeping the zone thickness large (many micrometers) to achieve very good efficiency for hard x-rays.

High-NA zone plates require concentric shells of alternating high- and low-Z materials with very small periods with similar material and layer requirements. In contrast to EUV multilayer optics, which have a large area, small curvature (e.g. a spherical mirror) and constant layer period, for zone plates the multilayers need to be formed as cylindrical shells with a relatively small radius of curvature and layer periods increasing towards the center according to Fresnel's rule.

FIG. 2 illustrates the process for manufacturing the inventive zone plates.

For both extended ultra violet (EUV) multilayer mirrors and x-ray zone plates, it is important to start depositing the layers on a very well defined substrate (i.e. polished for smoothness and right curvature). For EUV mirrors this is achieved by polishing a block of silicon to the desired shape. To avoid the problems that arise from depositing on a wire ("sputtered-sliced" zone plates), we propose to use a substrate that takes the form of a hole such as a blind hole or a through-hole. Since the quality of a zone plate depends most on the outermost zones with the smallest spacing, it is preferred to start depositing the fine zones first. By doing so, the outermost rings will be very well defined and any deposition errors or contamination effects will only affect zones closer to the center, which are much wider and for which the placement accuracy requirement is much more relaxed.

The first and crucial step in the production process of the disclosed x-ray lens is the fabrication of precision holes into a substrate for subsequent thin-film deposition, step 110. For optimum performance of a zone plate, the RMS error of the diameter has to be smaller than the design resolution and the local roughness of the side wall has to be less than one deposition layer (≈3 nm) to achieve high focusing efficiency.

As illustrated in FIG. 3, for this purpose, high resolution electron beam lithography is used, in one embodiment, to precisely define the diameter of the photoresist hole 214 into photoresist 210, that has been deposited on a polished silicon substrate 212.

After liquid development of the photoresist, an anisotropic etch such as a reactive ion etch or deep reactive ion etch is used to transfer the pattern into the silicon leaving a precisely defined substrate blind hole 216. The deep reactive ion etch into silicon, called Bosch process, is well understood and widely used in MEMS fabrication. In other embodiments, a through-hole is made completely through the substrate. A tube could even be used.

This process also has the advantage that the resulting sidewall slope can be altered from strictly vertical to under- or overcut leaving a slightly conical shape, i.e., a frustoconical hole. This is achieved by the precise control of the fluorine gas chemistry of the process. One possible application of this control would be to make the sidewall angle such that the outermost zones of the zone plate satisfy the Bragg-condition (giving rise to constructive interference as known from crystal diffraction). This could increase the focusing efficiency of the fabricated zone plate significantly.

Thus, generally, the side wall slope θ is between 0 and 10 degrees, from vertical. The slope is between 0.5 and 10 degrees, for some embodiments, to satisfy the Bragg condition.

In practice, arrays of precision holes comprising a number of hundreds up to tens of thousands will be fabricated in parallel on a single silicon substrate for parallel processing and statistical control.

Another critical step in the proposed fabrication technology is to know precisely the deposition rate and thickness distribution of the layer(s) on the inside wall of the hole.

Returning to FIG. 2, in the next step after the photoresist layer 210 is stripped or removed, the substrate 212 and the substrate hole 216 are coated with the alternating high- and low-Z material layers according to Fresnel's rule, step 112. Material combinations include for high Z material: gold, tungsten, copper, silver, and platinum; and for low Z: molybdenum, nickel, silicon, e.g., silicon dioxide, titanium e.g., titanium dioxide, and tantalum e.g., tantalum pentoxide. A initial smoothing layer is first deposited or grown to ensure a smooth sidewall of the hole 216, in some embodiments. In one example, the smoothing layer is a grown layer of silicon oxide.

Usually a vacuum deposition technique is used such as electron beam evaporation, with or without ion assist. Alternatives are chemical vapor deposition and atomic layer deposition.

As illustrated in FIG. 4, to get an even coating inside of a precision hole, a planetary motion of the substrate 212 in respect to the source 220 is required (see step 114 of FIG. 2). Ideally each precision hole 216 would rotate around its own center axis during deposition. The substrate is moved in the planetary motion with the successive material layers, high-Z and low-Z, are deposited.

Modeling and study of the effects of shadowing and the dependence of the sticking coefficient on deposition angle is required and dependent on the particular deposition system used. These factors need to be carefully taken into account to yield a uniformly thick region inside of the hole that contains the desired zone plate pattern.

Figure 5:
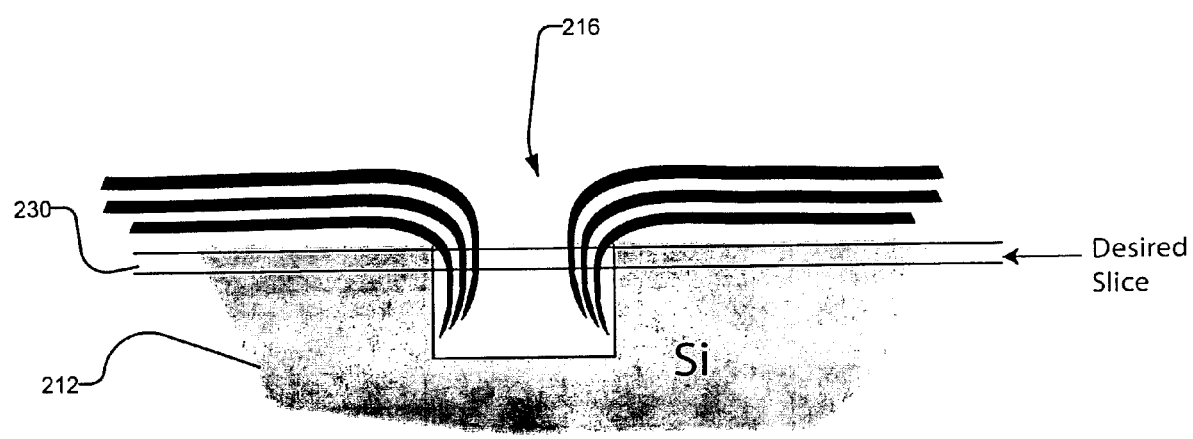
FIG. 5 illustrates the extraction of a small slice containing the desired zone plate pattern according to the invention.

After deposition of the thin layer stack, only a small region or cross-section 230 inside the hole 216 contains the desired zone plate pattern as illustrated in FIG. 5.

To extract the desired slice 230, the layers in the holes are sectioned. One approach to accomplish this is to adapt a plating and planarization procedure used in semiconductor processing, called damascene process. First, a thin electroplating seed layer is deposited uniformly across the substrate and the inner surface of the hole. In an electroplating process, copper or another suitable material is deposited until the hole is filled completely (see step 116, FIG. 2). Subsequently a chemical mechanical polishing process is used to planarize the substrate surface until the top of the desired slice is exposed in the sectioning process. Ion milling is another alternative.

After bonding the now planar top surface to another flat silicon substrate, step 120, a similar back thinning and planarization process can be employed until the bottom of the desired slice is exposed (see step 122, FIG. 2). The result is a zone plate on a silicon substrate, which can be used directly for x-ray focusing applications. Alternatively micromachining techniques such as focused ion beam milling can be used to relieve the slice of the zone plate.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for fabricating a zone plate lens, comprising:
   forming a hole in a substrate;
   depositing successive layers into the hole wherein the substrate is rotated in a planetary fashion during the deposition step; and
   sectioning the successive layers in the hole to form the zone plate lens.

2. A method as claimed in claim 1, wherein the step of sectioning the successive layers in the hole comprising polishing the substrate.

3. A method as claimed in claim 1, wherein the step of sectioning the successive layers in the hole comprising ion milling the substrate.

4. A method as claimed in claim 1, further comprising filling the hole.

5. A method as claimed in claim 4, further comprising planarizing after the step of filling the hole.

6. A method as claimed in claim 1, wherein the depositing successive layers into the hole includes deposition processes including atomic layer deposition.

7. A method as claimed in claim 1, wherein the step of forming the hole comprises forming the hole with vertical sidewalls.

8. A method as claimed in claim 1, wherein the step of forming the hole comprises forming the hole with sloping sidewalls.

9. A method as claimed in claim 8, wherein a slope of the sidewalls is between 0.5 and 10 degrees.

10. A method as claimed in claim 1, wherein the step of forming the hole comprises patterning a photoresist layer and transferring the pattern into the substrate in an etch process.

11. A method as claimed in claim 10, wherein the etch process includes the Bosch process.

12. A method for fabricating a zone plate lens, comprising:
    forming a hole in a substrate;
    depositing successive layers into the hole;
    planarizing after filling the hole and sectioning the successive layers in the hole to form the zone plate lens;
    bonding to a new substrate after the step of planarizing.

13. A method as claimed in claim 12, further comprising planarizing a back side of the substrate.

14. A method as claimed in claim 12, wherein the depositing successive layers into the hole includes using deposition processes including atomic layer deposition.

15. A method as claimed in claim 12, wherein the step of forming the hole comprises forming the hole with vertical sidewalls.

16. A method as claimed in claim 12, wherein the step of forming the hole comprises forming the hole with sloping sidewalls.

17. A method as claimed in claim 16, wherein a slope of the sidewalls is between 0.5 and 10 degrees.

18. A method as claimed in claim 12, wherein the step of forming the hole comprises patterning a photoresist layer and transferring the pattern into the substrate in an etch process.

19. A method as claimed in claim 18, wherein the etch processes is the Bosch process.

20. A method as claimed in claim 12, wherein the substrate is rotated during the deposition step.

21. A zone plate lens made by a method comprising:
forming a hole in a substrate;
depositing successive layers into the hole wherein the substrate is rotated in a planetary fashion during the deposition step; and
sectioning the successive layers in the hole to form the zone plate lens.

22. A zone plate lens as claimed in claim 21, wherein the step of sectioning the successive layers in the hole comprising polishing the substrate.

23. A zone plate lens as claimed in claim 21, wherein the step of sectioning the successive layers in the hole comprising ion milling the substrate.

24. A zone plate lens as claimed in claim 21, further comprising filling the hole.

25. A zone plate lens as claimed in claim 24, further comprising planarizing after the step of filling the hole.

26. A zone plate lens made by a method comprising:
forming a hole in a substrate;
depositing successive layers into the hole;
filling the hole;
planarizing after the step of filling the hole and sectioning the successive layers in the hole to form the zone plate lens; and
bonding to a new substrate after the step of planarizing.

27. A zone plate lens as claimed in claim 14, further comprising planarizing a back side of the substrate.

\* \* \* \* \*